United States Patent [19]

van Buren, Jr.

[11] 4,179,977
[45] Dec. 25, 1979

[54] ENCAPSULATED FASTENER

[75] Inventor: Harold S. van Buren, Jr., Lincoln, Mass.

[73] Assignee: TRW Inc., Cleveland, Ohio

[21] Appl. No.: 896,522

[22] Filed: Apr. 14, 1978

[51] Int. Cl.² .............................................. F16B 13/06
[52] U.S. Cl. ......................................... 85/81; 85/83; 151/41.75
[58] Field of Search ................... 85/80, 81, 82, 83, 84, 85/5 P; 151/41.72, 41.74, 41.75; 24/73 P

[56] References Cited

U.S. PATENT DOCUMENTS

| 2,788,047 | 4/1957  | Rapata    | 151/41.75 |
| 3,404,596 | 10/1968 | Ryder     | 85/82 X   |
| 3,469,493 | 9/1969  | Fisher    | 85/80 X   |
| 3,593,612 | 7/1971  | Schulze   | 80/80     |
| 3,703,120 | 11/1972 | van Buren | 85/83     |
| 3,803,973 | 4/1974  | Rapata    | 85/80     |
| 3,830,134 | 8/1974  | Erickson  | 85/80     |
| 3,869,958 | 3/1975  | Murayama  | 85/80     |
| 4,082,030 | 4/1978  | Erickson  | 85/80     |
| 4,085,652 | 4/1978  | Vanotti   | 85/83     |

FOREIGN PATENT DOCUMENTS

| 799761  | 11/1968 | Canada | 151/41.75 |
| 1374197 | 8/1964  | France | 85/82     |

Primary Examiner—Rodney H. Bonck
Attorney, Agent, or Firm—James R. O'Connor; Martin J. O'Donnell; Thomas C. O'Konski

[57] ABSTRACT

A one-piece plastic fastener that is insertable in a non-circular, e.g., square, panel aperture and that accommodates a screw for securing another article to the panel. The fastener includes a relatively flat head portion defining a central opening, a hollow, open-ended, inwardly flexible shank portion extending from a major surface of the head portion and cross-sectionally matching the shape and size of the panel aperture, and a closed-end barrel portion extending from the major surface of the head portion within the interior hollow space of the shank portion and defining an internal screw receiving and encapsulating bore aligned with the opening in the head portion. Longitudinal protuberances are formed on the external surface of the shank portion that cause the shank portion to flex inwardly as the fastener is pushed into the aperture. The aperture defining edges of the panel engage against tapers in the protuberances near the head portion and, because of the outward resiliency of the shank portion, reaction forces are generated which firmly press the head portion against the panel surface. The fastener thus seals and firmly retains itself in the aperture even prior to the time that a screw is tightened therein. During screw tightening, the barrel portion is adapted to twist within the shank portion and to cause further outward bulging of the shank portion walls. This outward bulging provides even greater resistance to removal of the fastener from the aperture. The fastener is particularly adapted for use in the manufacture of refrigerator and freezer cabinets.

11 Claims, 10 Drawing Figures

ENCAPSULATED FASTENER

BACKGROUND OF THE INVENTION

1. Field of the Invention

This invention relates generally to fastening devices and, more particularly, to an encapsulated fastener of the type adapted to be pushed and retained in an aperture in a panel and, in turn, to receive a threaded element, such as a screw, for mounting another article to the panel.

2. Description of the Prior Art

Encapsulated fasteners of the type referred to above are typically fabricated as a one-piece plastic component including a relatively flat head portion and a smaller area, protruding shank portion which together define an elongated, screw or other threaded element receiving bore or space. The shank portion of the fastener is pushed into a panel aperture until the head portion contacts the panel surface. The article to be mounted to the panel, which may be a bracket, a second panel, or any other such article, is brought against the head portion of the fastener and is clamped thereto by tightening the screw into the bore of the fastener. Typically, the shank portion of the fastener is long enough to accept the fully tightened length of the screw so that the screw is concealed or encapsulated therein. Fasteners of this type are shown, for example, in U.S. Pat. Nos. 2,788,047; 3,404,596; 3,593,612; 3,703,120; 3,830,134; and 3,869,958.

Encapsulated fasteners have been used in a wide variety of applications. The fasteners have been particularly useful in the manufacture of refrigerator and freezer cabinets for mounting shelf supporting brackets and the like to the inside panels of the cabinets. These appliances generally have a double wall construction including an inside panel and an outside panel with the space between the panels being filled with an insulative foam.

In this, as in most other applications, it is important that the fastener be capable of firmly gripping the aperture defining edges of the panel and of retaining itself in the aperture in all instances against inadvertent or accidental removal. The fastener should also be capable of sealing the aperture to prevent the leakage of the insulative foam through the aperture and onto the exposed surface of the panel. Ideally, the fastener should exhibit these retention and sealing abilities even prior to the time that a screw is tightened therein. In the manufacture of refrigerator/freezer appliances, the fasteners are usually added to the various panel apertures, followed by the blowing-in of the insulative foam under pressure in an uncured or relatively liquid state and then by the curing or solidifying of the foam in position. The screws and shelf supporting brackets and the like are usually not added until after the foam has cured.

Prior encapsulated fasteners have been less than totally effective in the refrigerator/freezer application. Many prior fasteners are simply not designed to firmly grip the aperture defining edges of the panel until a screw is fully tightened therein. In other fasteners, the panel gripping members are too weak and flexible to hold the fastener in the aperture under the pressure of the added foam. In still other fasteners, the panel gripping members are not capable of taking up tolerances in the thickness of the panel and lose their effectiveness if the panel thickness is not just right. As a result, the fasteners often become totally or partially dislodged during the foaming process, causing the foam to leak through the aperture and to solidify on the exposed surface of the panel. Effort must then be expended in removing the leaked foam and properly inserting the dislodged fasteners, which effort adds to the overall cost of the appliances.

The fastener of the present invention is designed specifically to possess improved aperture retention and sealing abilities of the type required in refrigerator/freezer and related applications.

OBJECTS OF THE INVENTION

It is, therefore, a broad object of the invention to provide an improved fastening device.

Another object of the invention is to provide an improved fastener of the type adapted to be pushed into and retained in a panel aperture, to receive a threaded mounting element, such as a screw, and to conceal or encapsulate the screw after it is fully tightened.

Another object of the invention is to provide a fastener of the type described that strongly retains itself in a panel aperture and that seals the panel aperture even prior to the time that a screw or other threaded element is tightened therein.

Another object of the invention is to provide a fastener of the type described that accommodates variations in the thickness of the aperture defining edges of the panel without affecting its retention abilities.

Another object of the invention is to provide a fastener of the type described that exhibits an even stronger retention in the panel aperture after a screw is fully tightened therein.

Still another object of the invention is to provide a fastener of the type described that is particularly adapted for use in the manufacture of refrigerator and freezer appliances.

SUMMARY OF THE INVENTION

A fastener embodied in accordance with the invention is formed as a unitary structure from a relatively resilient material, such as a plastic, and includes a relatively flat head portion defining a central opening, a hollow, open-ended shank portion extending from one major surface of the head portion and having a cross-sectional shape and size substantially matching that of a panel aperture in which the fastener is to be received, and a closed end barrel portion extending from the head portion within the interior hollow space of the shank portion and defining a threaded element receiving bore aligned with the opening in the head portion.

In a preferred embodiment of the invention, the shank portion of the fastener is of a relatively thin-walled construction so as to be resiliently inwardly flexible from all sides. Elongated protuberances are formed at spaced positions on the exterior surface of the shank portion. Each protuberance gradually tapers up in height or thickness at a point near the open end of the shank portion and tapers down in height or thickness at a point near the head portion. As the fastener is first pushed into a panel aperture, the protuberances engage against the aperture-defining edges of the panel and cause the shank portion to flex inwardly to allow its passage through the aperture. When the fastener is pushed fully home, the aperture-defining panel edges bear against the head taper in each protuberance and, because the shank portion seeks to expand to its original uncompressed condition, reaction forces are created which tend to pull the shank portion further into the aperture and to press the head portion against the panel surface. The fastener thus firmly grips the panel and seals the aperture even prior to the time that a screw or other threaded element is tightened therein.

The preferred fastener of the invention is adapted to be received within a square aperture and, consequently, the shank portion thereof has a matching, essentially square cross-sectional shape and size. The barrel portion has a smaller, essentially square, cross-sectional shape and size that tapers or decreases as its closed end is approached, with the sides of the barrel portion normally being parallel to but spaced from the inside surfaces of the shank portion. A short, integral, connecting leg member at each corner of the barrel portion connects the barrel portion to the interior surface of the shank portion near the head portion of the fastener.

With the fastener fully inserted in a panel aperture, a screw or other threaded element may be turned into the bore of the fastener to clamp an article to the panel. During the later stages of tightening, when the torque required to turn the screw is highest, the connecting leg members stretch and the barrel portion twists in the direction of the turning screw until the corners of the barrel portion engage against the inside surfaces of the shank portion. The twisting of the barrel portion causes further outward bulging of the sides of the shank portion, and this outward bulging serves to provide an even stronger retention of the fastener in the aperture.

BRIEF DESCRIPTION OF THE DRAWING

The foregoing and other objects, features and advantages of the invention will be better understood from the following detailed description taken in conjunction with the accompanying drawing in which.

DETAILED DESCRIPTION OF PREFERRED EMBODIMENT

Figure 1:
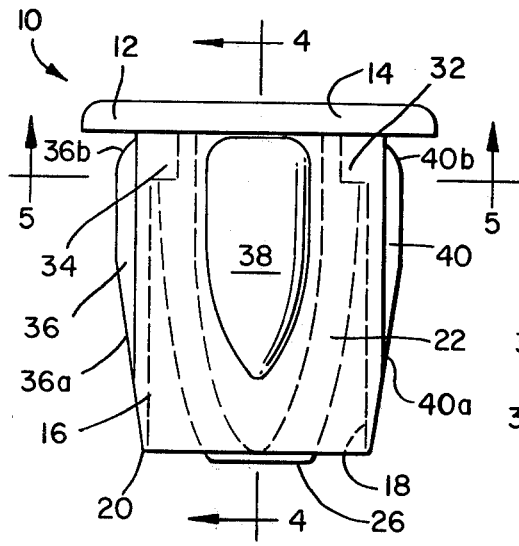
FIG. 1 is a side view of a fastener embodying the invention.
Figure 2:
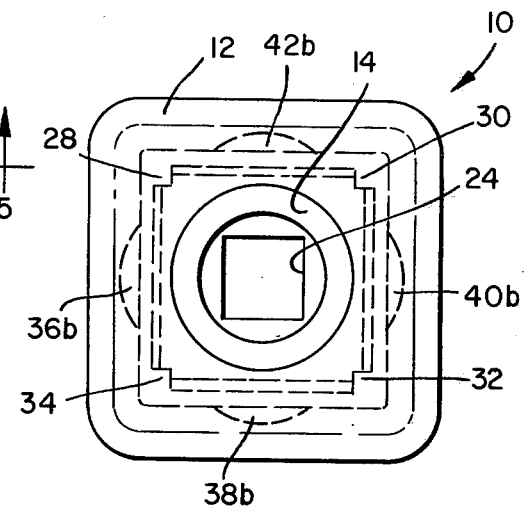
FIG. 2 is a top or head view of the fastener of FIG. 1.

Referring now specifically to FIGS. 1 through 5 of the drawing, there is shown a fastener 10 which is embodied in accordance with the principles of the invention and which is preferably molded as a one-piece component from nylon or other similar resilient plastic material.

The fastener 10 includes a head portion 12 having a flat, generally square shape. A tapered, or decreasing diameter, circular opening 14 is formed through the center of the head portion 12.

Figure 3:
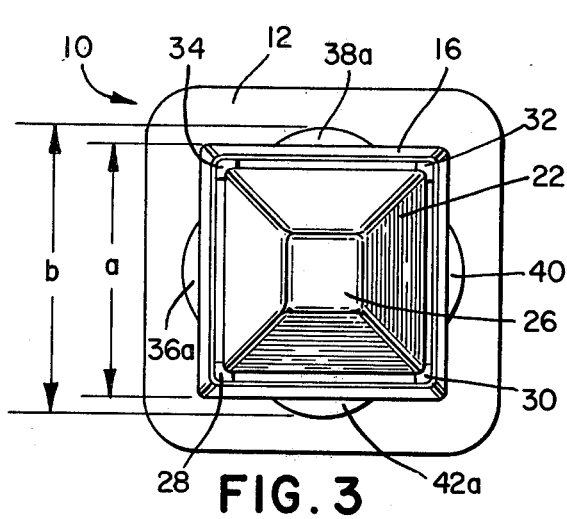
FIG. 3 is a bottom or end view of the fastener.
Figure 4:
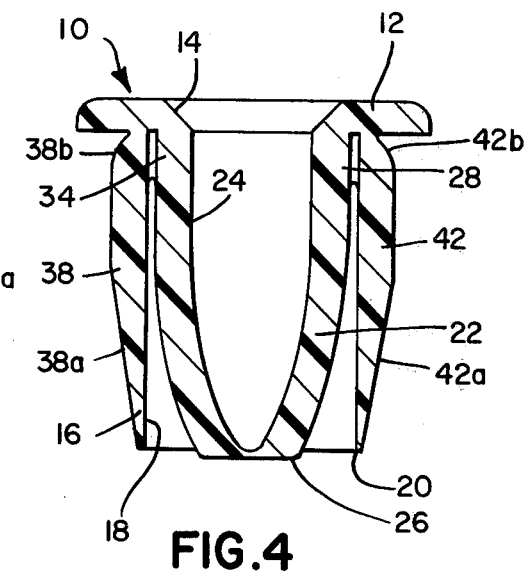
FIG. 4 is a side view in section of the fastener with the section being taken along the dash-dotted line 4—4 in FIG. 1.
Figure 5:
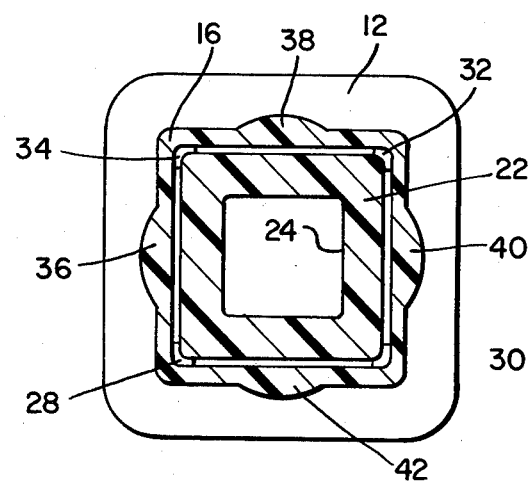
FIG. 5 is an end view in section of the fastener with the section being taken along the dash-dotted line 5—5 in FIG. 1.

A shank portion 16 extends downwardly from the lower major surface of the head portion 12. As best seen in FIGS. 3, 4 and 5, the shank portion 16 has a generally square, cross-sectional shape and defines a generally square interior space 18. The free or protruding end 20 of the shank portion 16 is open. The shank portion 16 is preferably of a relatively thin-walled construction so as to be resiliently inwardly flexible from all sides. The wall thickness of the shank portion 16 near its free end 20 preferably tapers to an even smaller thickness than that of the remainder thereof.

A barrel portion 22 also extends downwardly from the lower major surface of the head portion 12 within the interior space 18 defined by the shank portion 16. As best seen in FIGS. 3, 4 and 5, the barrel portion 22 also has a generally square, cross-sectional shape and defines a generally square interior bore 24 that is aligned with the opening 14 in the head portion 12. The cross-sectional width of the barrel portion 22 is, however, smaller than that of the interior space 18 so that the barrel portion 22 is, in effect, suspended therein with an equal amount of space around its periphery.

The free or protruding end 26 of the barrel portion 22 extends a small distance beyond the free end 20 of the shank portion 16 and is closed or sealed. As indicated in FIG. 4, the cross-sectional area of the barrel portion 22 tapers or decreases starting at about its midpoint and continuing to its free end 26. The barrel portion 22 has a larger wall thickness than that of the shank portion 16.

The barrel portion 22 is connected to the interior surface of the shank portion 16 by four integral, generally L-shaped leg members 28, 30, 32 and 34. The leg members 28 through 34 are located at each corner of the barrel portion 22 near the head portion 12. As best seen in FIGS. 1 and 4, the leg members 28 through 34 extend only a short distance downwardly from the head portion 12.

Elongated protuberances 36, 38, 40 and 42 are formed on the four generally flat outside surfaces of the shank portion 16. Each protuberance 36 through 42 gradually increases or tapers upwardly in height or thickness at a point 36a through 42a, respectively, near the free end 20 of the shank portion 16, and gradually decreases or tapers down in thickness at a point 36b through 42b, respectively, in advance of the lower major surface of the head portion 12.

Figure 6:
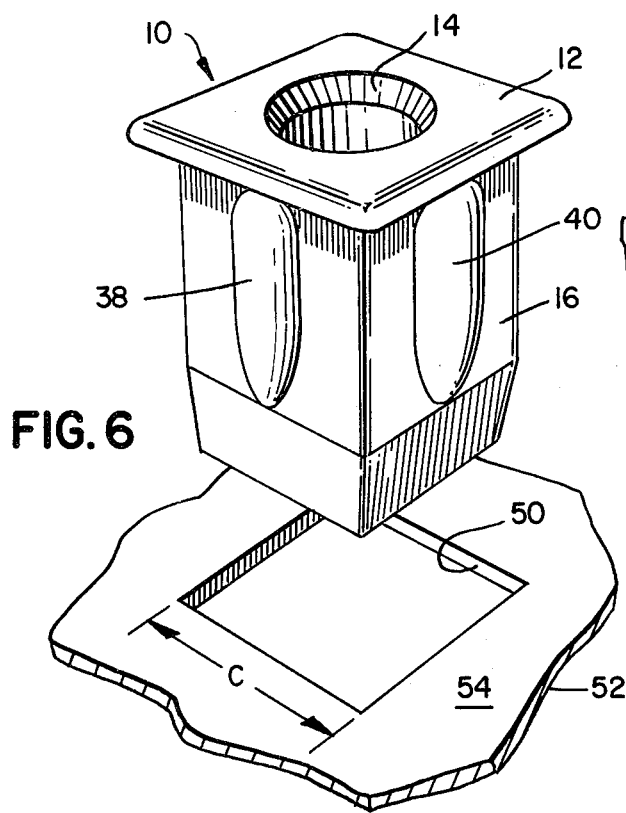
FIG. 6 is a perspective view illustrating a fastener of the type shown in FIG. 1 prior to its insertion in an aperture in a panel.

The cross-sectional shape and size of the shank portion 16 of the fastener 10 is selected to match, or substantially match, that of an aperture in a panel in which the fastener 10 is to be received. Thus, as illustrated in FIG. 6, the fastener 10 is adapted for insertion in a square aperture 50 formed in a panel 52. Best results have been obtained when the outside width a (FIG. 3) of the shank portion 16 is slightly less than the specified width c (FIG. 6) of the panel aperture 50 and when the added width b (FIG. 3) due to the protuberances 36 through 42 is slightly greater than the specified width c of the aperture 50. By way of specific example, the aperture 50 may have a width c in the range of 0.270 to 0.280 inches. In such a case, the shank portion 16 of the fastener 10 preferably has a width a in the range of about 0.260 to 0.270 inches and the added width b due to the protuberances 36 through 42 is about 0.290 to 0.300 inches.

To mount the fastener 10, it is pushed into the aperture 50 until the head portion 12 thereof engages against the exposed surface 54 of the panel 52. The protuberances 36 through 42 engage against the aperture-defining edges of the panel 52 and cause the shank portion 16 to collapse or flex inwardly to allow its passage through the aperture 50. As the head portion 12 of the fastener 10 approaches the panel surface 54, the aperture defining edges of the panel 52 bear against the head tapers 36b through 42b in each of the protuberances 36 through 42. Because of the outward resiliency of the shank portion 16 and of the orientation of the head tapers 32b through 42b, reaction forces are generated which tend to pull the shank portion 16 further into the aperture and press the head portion 12 firmly against the exposed panel surface 54. These forces serve to hold the fastener 10 firmly in position in the aperture 50.

Figure 7:
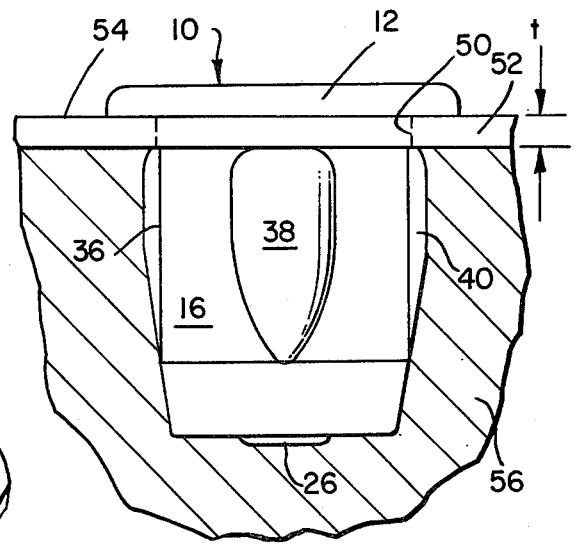
FIG. 7 is a side pictorial view, partly in section, showing the fastener of FIG. 6 fully inserted in the panel aperture with an insulative foam occupying the space to one side of the panel.

As mentioned above, the fastener 10 is particularly useful in the manufacture of insulated refrigerator and freezer cabinets of the type including an outer wall panel and an inner wall panel defining a cavity that is filled with an insulative foam. Illustratively, the panel 52 shown in FIGS. 6 and 7 represents the inner wall panel of such a two walled refrigerator cabinet structure with the space below the panel 52 in the figures corresponding to the cavity to be filled with insulative foam. The aperture 50 is one of many similar apertures formed at various locations in the panel 52 and used in securing shelf supporting brackets and like articles to the interior of the cabinet. An insulative foam 56 is shown in FIG. 7 occupying the cavity beneath the panel 52.

As noted, the fastener 10 should be capable of sealing and firmly retaining itself in the aperture 52 even prior to the time that a screw or other threaded element is tightened into its central bore 24. The fastener 10 has been found to be admirably suited for this purpose and to be superior to many prior fasteners in this regard. This superiority is believed to be the result of several factors. Firstly, the shank portion 16 of the fastener 10 resiliently and firmly grips the panel 52 around the entire periphery of the aperture 50. With many prior fasteners, the panel 52 would be gripped only at two discrete locations around the aperture 50. The pressure of the expanding foam during the foaming process thus becomes concentrated at the discrete locations and, because of this concentration, the likelihood of dislodgment increases.

Also, with the fastener 10, the foam 56 tends to enter the open end 20 of the shank portion 16 and to expand within the interior space 18 between the barrel portion 22 and interior surface of the shank portion 16. The force of the penetrating foam is believed to supplement the resiliency of the shank portion 16 tending to cause its outward expansion and therefore to improve the grip on the panel 52.

Further, the head tapers 36b through 42b on the shank portion protuberances 36 through 42 respectively, of the fastener 10 serve to generate the above mentioned fastener retaining reaction forces even though the thickness t (FIG. 7) of the panel 52 near the aperture 50 may be greater or less than the preferred or specified thickness. Unlike many prior fasteners, the fastener 10 thus readily accommodates panel thickness tolerances of the range normally encountered with mass produced panels of the type used in the manufacture of refrigerator/freezer cabinets.

Figure 8:
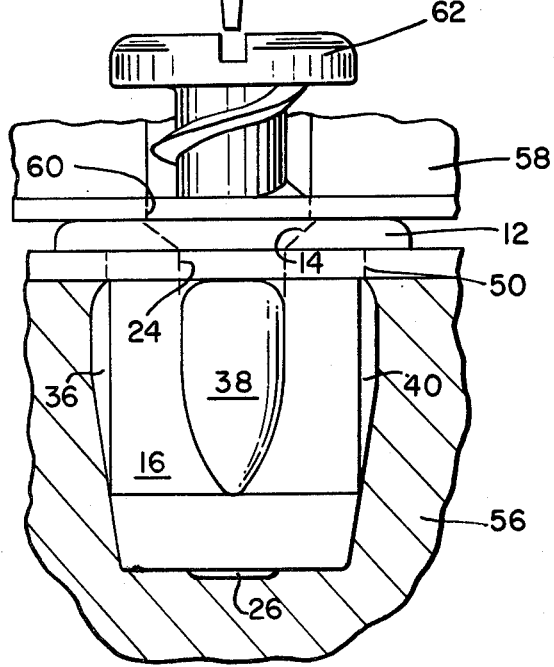
FIG. 8 is a side pictorial view, partly in section, showing the fastener in the process of receiving a screw used to clamp another article to the panel.

Once the foaming process is complete and the foam 56 cures or solidifies in position, the shelf supporting brackets and like articles may be mounted to the panel 52 using the fastener 10. In FIG. 8, a shelf supporting bracket 58 is illustrated which includes a mounting aperture 60. The bracket 58 is brought against the head portion 12 of the fastener 10 and the mounting aperture 60 in the bracket 58 is aligned with the opening 14 in the head portion 12. A screw 62 is inserted through the aperture 60 and into the opening 14 in the head portion 12 of the fastener 10. As the screw 62 is turned, as by screwdriver 64, its threads bite into the interior walls of the barrel portion 22 defining the bore 24 and the screw 62 advances into the bore 24. When the screw 62 is fully tightened, it clamps the bracket 58 against the head portion 12 of the fastener 10.

Figure 9:
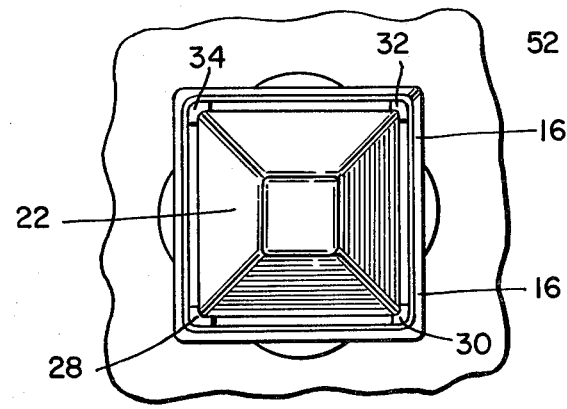
FIG. 9 is an end view of the fastener fully inserted in the panel aperture and prior to the final tightening of the screw.
Figure 10:
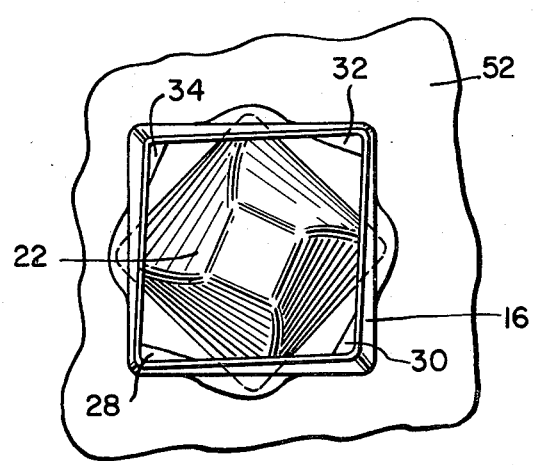
FIG. 10 is an end view of the fastener after the screw is fully tightened.

FIGS. 9 and 10 are end views of the fastener 10 taken from within the cavity defined by the panel 52 and illustrate the condition of the barrel portion 22 before and after, respectively, the screw 62 is fully tightened therein. The insulative foam 56 has been omitted from FIGS. 9 and 10 for clarity.

As indicated in FIG. 9, the barrel portion 22 of the fastener 10 remains aligned with the interior walls of the shank portion 16 thereof during the early stages of tightening the screw 62. During the later stages of tightening, when the screw 62 has advanced well into the bore 24, the frictional resistance between the interior walls of the barrel portion 22 and the screw 62, and the torque required to turn the screw 62, increase. This causes the barrel portion 22 to twist, and the leg members 28 through 34 to elongate, in the direction of the turning screw 62. The barrel portion 22 continues to twist until its corners engage against the interior walls of the shank portion 16 beneath each protuberance 36 through 42. The shank portion walls are thus pushed or bulged outwardly in all four directions. This outward bulging of the shank portion 16 serves to provide even greater resistance to removal of the fastener 10 from the aperture 50.

In summary, therefore, the fastener 10 exhibits improved panel aperture retention and sealing abilities both prior to and after a screw is tightened therein. The fastener 10 is also desirable because of its relatively simple, one-piece construction which facilitates its economical fabrication in large quantities from a single resilient plastic material, such as nylon, using conventional plastic processes such as injection molding.

It is to be understood that the fastener 10 described in detail above and shown in the accompanying drawing is illustrative of only one specific embodiment of the invention, and that modifications thereto may be made by those skilled in the art without departing from the scope of the invention as defined by the appended claims. Also, while the fastener 10 has been described specifically for use in the manufacture of refrigerator/freezer cabinets, other uses of the fastener will be realized by those skilled in the art.

What I claim as new and desire to secure by Letters Patent of the United States is:

1. A fastener for insertion and retention in an aperture in a panel and for receiving a threaded element that clamps an article to the panel, said fastener being formed as a unitary component comprising:

A. a relatively flat head portion i. including first and second opposed major surfaces, and
   ii. defining a through opening between said surfaces;
B. a shank portion
   i. extending from the second major surface of said head portion,
   ii. defining an interior hollow space and and an open end,
   iii. having a cross sectional shape and size substantially matching that of the panel aperture in which the fastener is to be received,
   iv. being resiliently inwardly flexible from its sides to allow its passage through the panel aperture, and
   v. being resiliently expansible when said head portion engages the panel to retain said fastener in the aperture; and
C. a barrel portion
   i. extending from the second major surface of said head portion within the interior hollow space defined by said shank portion,
   ii. defining an interior, threaded element receiving bore communicating with the opening in said head portion,
   iii. having a closed end,
   iv. having a noncircular cross-sectional shape defining external corners that are normally spaced from the interior hollow space defining portions of said shank portion, and
   v. being adapted to twist relative to said shank portion to cause the respective corners of said barrel portion to engage against the inside surface of said shank portion and bulge said shank portion outwardly responsive to the tightening of the threaded element into said bore to provide for further resistance to removal of said fastener from said aperture and secure clamping of the article to the panel.

2. The fastener of claim 1 in which said shank portion further includes
   i. protuberances formed at spaced positions on the exterior surface of said shank portion, said protuberances being adapted to engage against the aperture defining edges of the panel and to cause the inward flexing of said shank portion as said fastener is inserted in the aperture.

3. The fastener of claim 2 in which each of said protuberances includes an increasing thickness taper near the open end of said shank portion and a decreasing thickness taper near said head portion of said fastener, the decreasing thickness tapers of said protuberances being adapted to engage against the aperture defining edges of the panel and, due to the outward resiliency of said shank portion, to generate reaction forces tending to press said head portion against the panel and to retain said fastener in the aperture.

4. A fastener for insertion and retention in an aperture in a panel and for receiving a threaded element that clamps an article to the panel, said fastener being formed as a unitary component comprising:
A. a relatively flat head portion
   i. including first and second opposed major surfaces, and
   ii. defining a through opening between said surfaces;
B. a shank portion
   i. extending from the second major surface of said head portion,
   ii. defining an interior hollow space and an open end, and
   iii. having a cross-sectional shape and size substantially matching that of a panel aperture in which the fastener is to be received; and
C. a barrel portion
   i. extending from the second major surface of said head portion within the interior hollow space defined by said shank portion,
   ii. defining an interior threaded element receiving bore communicating with the opening in said head portion,
   iii. having a closed end, and
   iv. having a non-circular cross-sectional shape defining external corners that are normally spaced from the interior hollow space defining surface of said shank portion;
D. said barrel portion being adapted to twist relative to said shank portion when the threaded element is tightened into the bore to cause the respective corners of said barrel portion to engage against the inside surface of said shank portion and thereby to cause an outward bulging of said shank portion to retain the fastener in the aperture.

5. The fastener of claim 4 in which the panel aperture has a generally square shape and in which said shank portion has a generally square, cross-sectional shape and size substantially matching that of the aperture.

6. The fastener of claim 5 in which said barrel portion has a generally square, cross-sectional shape that is smaller than the interior hollow space defined by said shank portion, the sides of said barrel portion normally being parallel to and spaced from the interior surface of said shank portion.

7. The fastener of claim 6 in which the cross-sectional size of said barrel portion decreases as its closed end is approached.

8. The fastener of claim 6 in which said barrel portion further includes
   leg members formed at the respective corners of said barrel portion near said head portion and connecting said barrel portion to the inside surface of said shank portion, said leg members being adapted to elongate when the threaded element is tightened into said bore.

9. The fastener of claim 4 in which the interior bore of said barrel portion is of a length sufficient to accommodate the fully tightened length of the threaded element therein so that the threaded element, when fully tightened, is encapsulated within said barrel portion.

10. The fastener of claim 4 comprising a unitary component molded from resilient plastic material.

11. The fastener of claim 10 comprising a unitary component molded from nylon.

* * * * *